May 30, 1961 G. E. HELLSTROM 2,986,231
COMPRESSED AIR BLEED AND SEPARATION
Filed Feb. 11, 1957

INVENTOR
G. EDWIN HELLSTROM
BY *Vernon F. Hauschild*
ATTORNEY

United States Patent Office 2,986,231
Patented May 30, 1961

2,986,231

COMPRESSED AIR BLEED AND SEPARATION

Gustav Edwin Hellstrom, West Hartford, Conn., assignor to United Aircraft Corporation, East Hartford, Conn., a corporation of Delaware Filed Feb. 11, 1957, Ser. No. 639,259

4 Claims. (Cl. 183—36)

This invention relates to the bleeding of gas from a passage and more particularly to the bleeding of compressed air from a powerplant such as a modern aircraft jet engine for an auxiliary use such as passenger compartment pressurizing.

In altitude flight above about 8,000 feet it is necessary for passenger comfort and safety to pressurize the airplane cabin in which the passengers are located. This is made necessary due to the rarified atmosphere at such altitudes. To counteract the discomfort brought about due to the reduced atmospheric pressure, the passenger compartment of an airplane is pressurized. Pressurization may also be needed for proper operation of sensitive aircraft mechanisms such as fuel controls. Since our modern aircraft jet engines utilize a compressor to compress air for powerplant use, the powerplant compressor is an available source of compressed air at any altitude and, therefore, it is the logical place from which to bleed compressed air to effect passenger compartment pressurization. Aircraft powerplants today mainly use axial flow compressors opposed to centrifugal flow compressors and the easiest place from which to bleed compressed air from such a compressor would be thru the outer compressor case at the downstream end of the compressor. After passing thru the compressor, the powerplant air would be at a high pressure and a bleed thru the compressor outer case would afford the minimum of trouble and complexity. Experience has shown, however, that it is not desirable to use compressed air bled thru a bleed in the compressor outer case due to the fact that such compressed air carries lubricating oil particles and other foreign matter which cause noxious odors in the passenger cabin and contaminate sensitive mechanisms. The lubricating oil particles come from compressor bearing oil seepage which is picked up within the compressor and flung outwardly by centrifugal force against the inner surface of the compressor outer case or any other outer gas passage defining wall, due to the whirling motion of the compressor rotors, and pushed downstream along the interior wall of the compressor outer case or other outer gas passage defining wall by the passage of the compressed air thru the compressor. Any air bled from the interior wall of the compressor outer case would carry this oil with it.

It is an object of this invention to permit the bleeding of clean compressed air from a compressor for passenger cabin and control use for example.

It is a further object of this invention to provide compressor air bleed means which will be light in weight, simple in construction and which will blend with existing powerplant parts to produce aerodynamic structures and therefore to cause minimal reduction in powerplant efficiency.

It is a further object of this invention to provide means for bleeding air from a compressor interior.

Other objects and advantages will be apparent from the specification and claims, and from the accompanying drawings which illustrate an embodiment of the invention.

Figure 1:
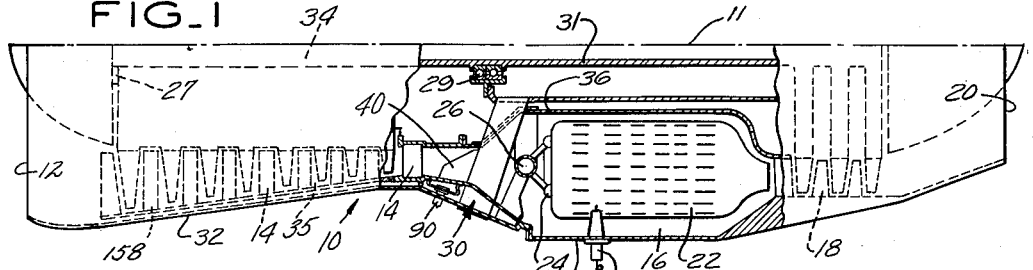
Fig. 1 is a partial cross-sectional view of a typical modern aircraft turbojet engine utilizing my invention.

Referring to Fig. 1 we see a modern aircraft turbojet engine 10 which comprises air inlet 12, compressor section 14, combustion section 16, turbine section 18 and exhaust outlet 20. Air enters powerplant 10 thru air inlet section 12 and is compressed as it passes thru compressor section 14. Axis or center line of engine 10 is shown at 11. The air is heated in combustion section 16 due to the fact that fuel is being burned in combustion chambers 22. Fuel enters combustion chambers 22 thru fuel nozzles 24 which are fed fuel by fuel manifold 26. Any ignition means such as spark plugs 28 may be used to ignite the fuel in combustion chambers 22. The heated gas being discharged from combustion section 16 passes thru turbine section 18 and is then directed in a thrust generating function thru exhaust outlet 20. Fig. 1 shows my compressor air bleed construction 30 very generally.

Compressor rotor 34 is supported in known fashion by bearings such as 27 and 29 on shaft 31 thereof, which bearings are oil lubricated by oil jets or other known means.

My invention is applicable to bleeding gas from any gas passage formed by concentric and coaxial, spaced inner and outer gas passage defining walls where the gas near the inner wall is desired elsewhere. An axial flow compressor in aircraft jet engine environment is a typical example, and therefore, is used as an example of a practical embodiment of my invention. Outer gas passage defining wall 150 comprises compressor outer case 32 or abutting ring shrouds 32a, contoured shroud 110 and burner outer case, each of which are preferably of circular cross section while inner gas passage defining wall 152 comprises compressor rotor 34, excluding blades 154, and wall members 36b, 36a and 36, each of which are preferably of circular peripheral cross section. The inner and outer gas passage defining walls 152 and 150, respectively, are concentric about axis 11 and form annular gas passage 35 therebetween.

Figure 2:
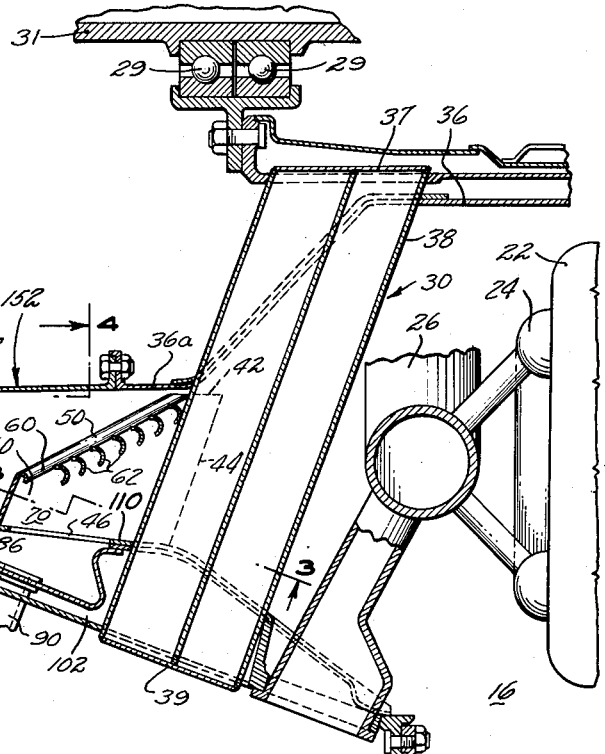
Fig. 2 is an enlarged cross-sectional view of a portion of the Fig. 1 powerplant showing in its environment a standard engine support with my air bleed attached thereto.
Figure 3:
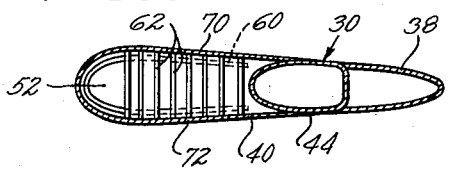
Fig. 3 is a sectional view taken along line 3—3 of Fig. 2.

My invention is shown in greater particularity in Fig. 2. My air bleed unit 30 is located between compressor unit 14 and combustion section 16. Compressor unit 14 serves to pump air thru gas passage 35 and comprises rotor assembly 34 which has a plurality of radially extending, axially spaced discs such as 154 each of which has a plurality of radially extending, circumferentially spaced blades 156 projecting from the periphery thereof. A stator unit such as 158 is placed between adjacent rotors and comprises stationary vanes 160, which are radially extending and circumferentially spaced, and supported between inner ring shroud 162 and outer ring shroud 32a. Outer shrouds 32a are constructed and abut and therefore may serve as a substitute for compressor outer case 32 in defining a portion of outer gas passage defining wall 150. A last stage stator unit 158' is positioned aft or downstream of rotor assembly 34. Rotor unit 34 and the plurality of stator units 158 and 158' coact to pump air thru gas passage 35. Support 38 extends radially between inner gas passage defining wall 152 and outer gas passage defining wall 150 and is attached to each so as to perform a supporting and spacing function therebetween to assist in forming gas passage 35. As best shown in Fig. 3, support 38 is of airfoil cross section to provide a minimum of aerodynamic losses as gas in passage 35 passes over the support. A plurality of supports 38 are located circumferentially about the gas passage 35 formed between outer wall 150 and inner wall 152 and extend radially therebetween to support, at least in part, inner wall 152 concentrically within outer wall 150. It will be noted that supports 38 are preferably tilted to be farther downstream with respect to engine 10 at their inner ends 37 than at their outer ends 39.

Figure 4:
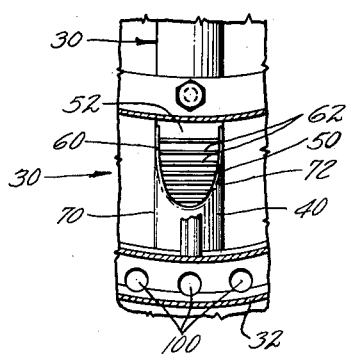
Fig. 4 is a view taken along line 4—4 of Fig. 2.

A hollow strut 40 is placed in front of each support 38 and is attached thereto by welding, brazing or any convenient attachment means along lines 42 and 44. Hollow strut 40 is also connected along line 46 to member 110 of outer wall 150 and projects inwardly therefrom toward the inner wall 152 and has an angular inner surface or portion 50 which has a hole 52 (Fig. 4) therein to place the interior of hollow strut 40 into communication with gas passage 35. Due to the angularity of surface 50, with respect to axis 11 of engine 10, hole 52 opens in a direction opposite to the direction of the gas flowing in passage 35 from compressor section 14 into combustion section 16. As best shown in Figs. 3 and 4, the outer or exterior surface of hollow strut 40 is smooth and smoothly blends in its connection to support 38 so that the combined cross section of support 38 and hollow strut 40 is of airfoil shape. It will be noted that angular inner surface 50 has inwardly rolled lips 60 so as to present an aerodynamic shape to the periphery of hole 52. As used herein, the terms airfoil and aerodynamic shape mean a shape presenting minimum resistance to gas flow thereover and which creates minimum drag.

Figure 5:
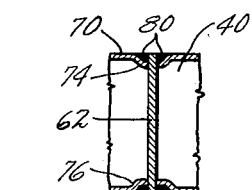
Fig. 5 is a fragmentary enlarged showing of the connection between the turning vane and the hollow strut of my compressor air bleed.

A plurality of turning vanes 62 extend laterally across inner surface 50 of hollow strut 40 to cause a direction change in the gas flowing from gas passage 35 into the hollow strut 40. Turning vanes 62 are of such number and spacing as to smoothly and efficiently change the angle of gas flow as it enters hollow strut 40 from compressor section 14. Turning vanes 62 are shaped to extend substantially parallel to the wall axis 11 adjacent hole 52 and to turn thru greater than 90°. Turning vanes 62 are slid into or received in plural plane slots which are formed in pairs on opposite sides 70 and 72 of hollow strut 40. Fig. 5 depicts plural plane slots 74 and 76 as a typical pair of plural plane slots located in spaced relation across inner surface 50 and in opposite walls 70 and 72 of hollow strut 40. The plural plane slots, such as 74 and 76 are of the same shape as turning vanes 62 but slightly larger so as to receive the vanes 62. Each slot such as slot 74 is recessed in the turning vane wall such as 70 such that when the weld metal 80 or other joining material is used to attach turning vane 62 to hollow strut 40, a smooth aerodynamic surface is formed as the outer or exterior surface of hollow strut 40, thereby avoiding the bulge of the welding metal bead which would be formed if the plural vane slots such as 74 were not recessed. Angular manifold 86 is located external of the gas passage defining outer wall 150 and is in free communication with the interior of hollow strut 40 thru hole 46. Conduit means 90 projects from the interior of manifold 86 and is connected at its other end (not shown) to the engine location such as passenger compartment or control compartment where the compressed air source is desired.

With this construction it will be seen that compressed air flows thru the gas passage formed between outer wall 150 and inner wall 152 and while much of it passes between the plurality of hollow struts 40 directly into combustion chamber section 16 and combustion chambers 22 therewithin, a preselected portion of it is intercepted by hole 52 of hollow strut 40 and caused to change direction by turning vanes 62 to be introduced smoothly into the interior of hollow strut 40. This portion of the total compressed air then passes from hollow strut 40 into manifold 86 and then is directed by conduit means 90 to the desired location.

It will be noted that the construction of our air bleed is simple, that it causes little aerodynamic loss to the powerplant gas flow and that it gathers compressed air from an area removed from the outer case or wall 32 and directs it, free of oil particles, to the powerplant location in need of compressed air. It will further be noted that in addition to performing a direction changing function upon the compressed air, turning vanes 62 further serve to remove any oil particles that may exist in the air by serving as a centrifugal separator. As best shown in Fig. 2, turning vanes 62 in cooperation with the remainder bleed unit 30, turn the gas intercepted thereby to change direction more than 90° to cause the oil and foreign matter to centrifuge onto vanes 62. Any oil separated out of the bleed air by the centrifugal separator action of bleed unit 30 will eventually reach the low point in manifold 86 where, in conventional fashion, it may be accumulated in a trap for eventual disposition by plug removal.

The oil or other contaminant which has been centrifuged outwardly by compressor 14 to the interior surface of outer case 32 and passed therealong in a downstream direction, will pass thru holes 100 into compartment 102 then scavenge to a sump by gravity means in well-known fashion. Oil and other contaminants pass to the interior surface of outer case 32 thru the abutting surfaces 200 between adjacent shrouds 32a particularly when there is a clearance between shrouds 32a before the engine 10 reaches operating temperature, whereupon thermal expansion substantially closes these clearances. The foreign matter which follows along shrouds 32a and member 110 may be removed from engine 10 by removing burner case 33.

It is to be understood that the invention is not limited to the specific embodiment herein illustrated and described, but may be used in other ways without departure from its spirit as defined by the following claims.

I claim:

1. In an aircraft engine, a compressor having inner and outer walls which are concentric and coaxial, means supporting said walls in spaced relation to form an annular gas passage therebetween including a support of airfoil cross section extending between said outer and inner walls, said compressor including a rotor which rotates to pass gas through said gas passage in rotary fashion thereby causing lubricant seepage to be thrown against said outer wall by centrifugal force and passed rearwardly therealong, at least one hollow strut connected to said outer wall and projecting therefrom inwardly toward said inner wall while terminating short thereof and having an inner portion which is spaced from said outer wall and has a smooth periphery hole which is positioned in angular relation to the wall axis and which opens in a direction to intercept gas flow in said gas passage and which places the interior of said hollow strut in communication with said gas passage at a location spaced from said outer wall, said hollow strut located upstream of and connected to said support and contoured to form a shape of airfoil cross section therewith, a plurality of turning vanes extending laterally across said hole to cause a direction change in the gas flowing into said strut, a manifold located external of said outer wall and means connecting said strut to said manifold such that gas may flow from a gas passage location spaced from said outer wall through said strut and into said manifold.

2. In combination with an inner gas passage defining wall of circular peripheral cross section located within and concentric and coaxial with an outer gas passage defining wall of circular cross section, means supporting said walls in spaced relation to form an annular gas passage therebetween, including a plurality of substantially radially extending and circumferentially equally spaced supports of airfoil cross section extending between said outer and inner walls, means contained within said outer gas passage defining wall and capable of rapid rotation about said axis for pumping gas through said gas passage, at least one hollow strut connected to said outer wall and projecting inwardly toward said inner wall while terminating short thereof and having an inner portion spaced from said outer wall and with a smooth periphery hole therein which is positioned in angular relation to the wall axis and which opens in a direction to intercept gas flow in said gas passage and which places the interior of said hollow strut in communication with said gas passage at a location remote from said outer wall, said hollow strut being located adjacent and connected to one of said supports and shaped to form an airfoil cross-sectional shape therewith, a plurality of recessed plural plane slots formed in pairs and with the slots of each pair lying on opposite sides of said hollow strut substantially adjacent said hole and further with the pairs of slots in spaced relation across said hole, a plurality of turning vanes with each vane conforming to the shape of and received in one of said pairs of slots and attached to said hollow strut so as to fill each of said recesses, a manifold located external of said outer wall, and means connecting said strut to said manifold such that gas may flow from said gas passage location remote from said outer wall through said strut and into said manifold.

3. In combination with an inner gas passage defining wall of circular peripheral cross section located within and concentric and coaxial with an outer gas passage defining wall of circular cross section, means supporting said walls in spaced relation to form an annular gas passage therebetween including at least one support of airfoil cross section extending between said outer and inner walls, means for pumping gas through said gas passage and centrifuging liquid matter therefrom and against said outer gas passage defining wall, at least one hollow strut connected to said outer wall and projecting inwardly therefrom toward said inner wall and having an inner surface which is spaced from said outer wall and is in angular relation to the wall axis and contains a hole with rolled-in lips which opens in a direction to intercept gas flow in said gas passage and which places the interior of said hollow strut in communication with said gas passage at a location remote from said outer wall, said hollow strut located upstream of and connected to said support and shaped to form an airfoil cross section therewith, a plurality of recessed plural plane slots formed in pairs and with the slots of said pairs lying on opposite sides of said hollow strut substantially adjacent said hole and further with each pair of slots in spaced relation across said hole, each of said slots extending substantially parallel to said axis adjacent said hole and smoothly turning away from said axis through greater than a right angle, a plurality of turning and separator vanes with each vane conforming to the shape of and received in one of said pairs of slots and attached by fused metal to said hollow strut so as to fill each of said recesses and render said strut exterior smooth, a manifold located external of said outer wall, means connecting said strut interior to said manifold interior such that gas may flow from said gas passage location remote from said outer wall through said strut and into said manifold, and means to conduct the gas from said manifold to the desired location.

4. An aircraft engine having an axis and an oil lubricated bearing supported axial flow compressor, said compressor having an outer case enveloping a rotor assembly which comprises a plurality of radially extending, axially spaced rotors with each rotor comprising a disc concentric about said axis with a plurality of circumferentially spaced blades projecting radially from the periphery thereof to be in close proximity to said outer case, said rotor assembly being supported for rotation on bearings, said compressor further having a plurality of radially extending, axially spaced stator units with one stator unit positioned between adjacent rotors and with a last stator unit located immediately downstream of said rotor assembly, each of said stator units being concentric about said axis and comprising a plurality of circumferentially spaced, radially extending stationary vanes with an outer shroud engaging and positioning the radially outer end of each of said vanes in each of said stator units and said last stator unit further having an inner shroud engaging and positioning the radially inner end of each of said last stator unit vanes, each of said shrouds comprising a circumferentially extending ring with substantial axial dimension with said outer shrouds abutting adjacent outer shrouds and positioned by said outer case, an inner wall member and an outer wall member each of circular cross section extending downstream from said inner shroud and said outer shroud of said last stator unit respectively to form a gas passage therebetween such that said outer wall member coacts with said abutting outer shrouds to form an outer gas passage defining wall while said inner wall member forms an inner gas passage defining wall, at least one support of airfoil cross section extending between said outer and inner walls, at least one hollow strut connected to said outer wall and projecting inwardly therefrom toward said inner wall and having an inner surface which is spaced from said outer wall and is positioned in angular relation to said axis and contains a hole with rolled-in lips which opens in a direction to intercept gas flow in said gas passage and places the interior of said hollow strut in communication with said gas passage at a location remote from said outer wall, said hollow strut located upstream of and connected to said support and to form an airfoil cross section therewith, a plurality of recessed plural plane slots formed in pairs and with the slots of each of said pairs lying on opposite sides of said hollow strut substantially adjacent said hole and further with said slot pairs in spaced relation across said hole, each of said slots extending substantially parallel to said axis adjacent said hole and smoothly turning away from said axis through greater than a right angle, a plurality of gas turning and lubricant separating vanes with each vane conforming to the shape of and received in one of said slot pairs and welded to said hollow strut so as to fill each of said slot recesses and render said strut exterior smooth, means to rotate said compressor rotor assembly rapidly to cause said rotor assembly to coact with said stator units to pressurize and pump gas axially through said compressor and into said gas passage and so that the rotation of said rotors centrifuge lubricant seepage radially outwardly against said outer gas passage defining wall to be carried downstream therealong by said compressor pressurized gas pumping action, a manifold located external of said outer wall and means connecting said strut to said manifold such that gas may flow from said gas passage location remote from said outer wall through said strut and into said manifold, means to conduct the pressurized gas from said manifold to the desired location, and means to remove lubricant separated from said gas through said outer wall.

References Cited in the file of this patent

UNITED STATES PATENTS

| | | |
|---|---|---|
| 1,989,163 | Beck et al. | Jan. 29, 1935 |
| 2,216,046 | Peck | Sept. 24, 1940 |
| 2,365,328 | Bell | Dec. 19, 1944 |
| 2,380,839 | Hand | July 31, 1945 |
| 2,557,101 | Mayer | June 19, 1951 |
| 2,648,193 | Redding et al. | Aug. 11, 1953 |
| 2,847,822 | Hausmann | Aug. 19, 1958 |

FOREIGN PATENTS

| | | |
|---|---|---|
| 380,099 | Great Britain | Aug. 29, 1932 |
| 562,227 | Germany | Oct. 6, 1932 |